UNITED STATES PATENT OFFICE.

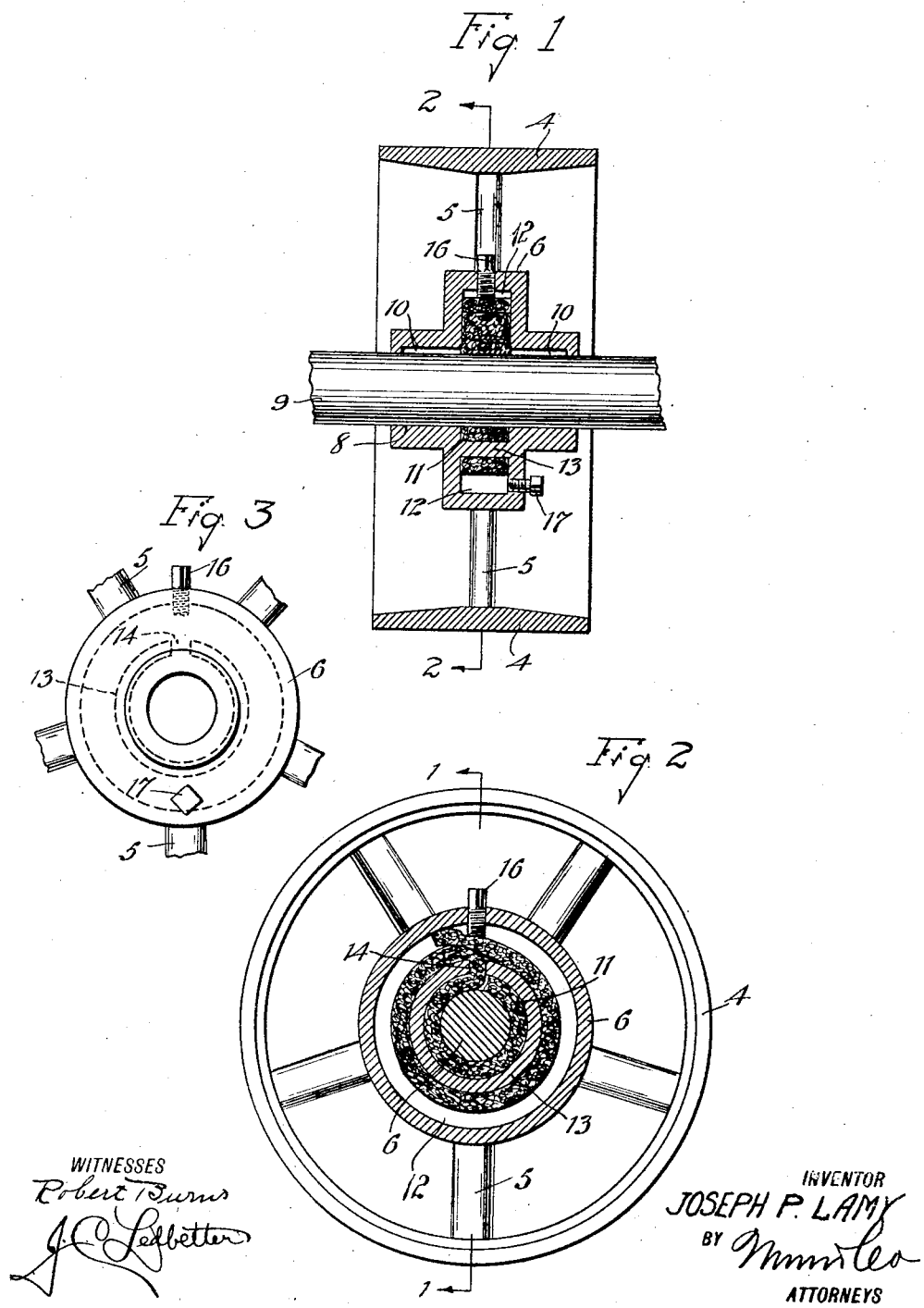

JOSEPH PIUS LAMY, OF WOONSOCKET, RHODE ISLAND.

LOOSE PULLEY.

1,331,440.  Specification of Letters Patent.  Patented Feb. 17, 1920.

Application filed May 22, 1919. Serial No. 299,049.

*To all whom it may concern:*

Be it known that I, JOSEPH PIUS LAMY, a citizen of the United States, and a resident of Woonsocket, county of Providence, and State of Rhode Island, have invented a new and Improved Loose Pulley, of which the following is a full, clear, and exact description.

This invention relates to loose pulleys, and particularly relates to a means of lubricating pulley and wheel bearings.

An object of the invention is to provide means for lubricating pulley and wheel bearings which will positively supply lubricant to the moving parts, and which will provide a reserve supply of lubricant and means for transmitting the reserve lubricant to the frictionally moving parts.

It is an object of this invention to fully portray mechanical means for carrying out the above purposes, and further, to provide such oiling means as will be comparatively inexpensive to build, simple in its application and use.

With the above principal objects, and others, in view, the invention has relation to a certain arrangement of lubricating features contained within the pulley structure, an example of which is described in the illustrated example herewith, and specifically designated in the appended claims.

Figure 1 of the drawings shows a sectional view taken transverse to the plane of pulley rotation.

Fig. 2 shows a sectional view taken parallel with the plane of the pulley rotation.

Fig. 3 shows a fragmentary front detailed view of the pulley hub in which the lubricating parts are mounted.

Referring more in particular to the drawings, the numeral 4 points out the rim of a standard form of pulley variously used in industrial establishments for facilitating the transmission of power. This pulley is usually constructed with spokes 5 integrally cast or made with a pulley hub 6. My invention directly relates to the pulley hub construction, in which oiling means is mounted.

The pulley hub is provided with a journal-bearing bore 8 which is rotatably mounted upon the journal or shaft 9. This journal bearing is provided with an oil groove 10 cut parallel with the axis of the pulley hub in terminating approximately each end of said hub.

The journal bearing is internally grooved as designated by the numeral 11. This groove extends around the journal bearing concentrically therewith. The journal hub is provided with a concentric opening or groove 12 machined or cut therein for the purpose of holding a reserve supply of lubricant. The internal groove 11 and reserve reservoir 12 are separated from each other by a concentric web 13, which web is spaced from the journal bearing contact or spaced from the shaft 9. A passage-way 14 is cut in the concentric web 13 so as to communicate the internal groove 11 with the reserve reservoir 12. This opens the reservoir and internal groove so that lubricant may be transmitted to the oil grooves 10.

Wick packing will be disposed within the internal groove 11 and pressed into the passage-way 14 and lapped around the concentric web. This wick packing will thus form a medium by which the lubricant may be transmitted by capillary attraction from the outside reserve reservoir to the internal oil groove 11.

Oil supply holes are provided in the periphery of the pulley hub 6 and closed by suitable set screws or plugs 16 and 17. It may be preferable to locate one of these filling holes in the rim of the hub 6 while the other hole may be drilled in the face thereof as indicated by the numeral 17. It will also be desirable to dispose the filling holes opposite one another so that one of the filling holes will usually come to rest at an uppermost position or near an uppermost position so that the plug may be removed and oil induced into the hole.

In constructing this form of pulley it may be desirable to build the pulley up in two sections so that the reserve reservoir and internal oil groove may be properly turned or cut before the pulley hub is assembled with the wheel. In case the pulley hub is made in two sections, the sections may be joined together by properly fitting one into the other and clamping the parts with cap screws or suitable bolts. However, in some cases it will be desirable to employ a pulley hub integrally made, and in such case the oil reservoir will be cored out in the pulley hub at the time said hub is cast.

This form of pulley hub will admit of the use of different sizes of bushings should it become necessary to employ such parts for fitting up the pulley to different sized shafts.

This form of lubricating means provides self-oiling features which will adequately supply oil from the reserve reservoir through the wick and passage 14 and directly in contact with the journal bearing.

Having thus described my invention, what I claim as new, and desire to secure by Letters Patent is:

1. Oiling means for loose pulleys comprising; a pulley with a journal-bearing hub, said hub provided with a concentric web spaced from the journal bearing, and a reserve reservoir, a passage formed through the concentric web, and wick packing placed in the journal bearing adjacent the concentric web, and wick packing extending through the passage-way, and wick packing placed in the reserve reservoir.

2. Oiling means for loose pulleys comprising; a pulley with a journal-bearing hub, said hub provided with a concentric web spaced from the journal bearing, and a reserve reservoir, a passage formed through the concentric web, and wick packing placed in the journal bearing adjacent the concentric web, and wick packing extending through the passage-way, and wick packing placed in the reserve reservoir, and a plurality of closure plugs fitted into oil filler openings.

JOSEPH PIUS LAMY.